United States Patent Office 3,733,325
Patented May 15, 1973

---

3,733,325
PREPARATION OF AMINOETHYLPIPERAZINE
Ernest Leon Yeakey, Austin, Tex., assignor to Jefferson Chemical Company, Inc., Houston, Tex.
No Drawing. Filed Dec. 16, 1970, Ser. No. 98,920
Int. Cl. C07d 51/70
U.S. Cl. 260—268 ST        6 Claims

ABSTRACT OF THE DISCLOSURE

A novel continuous process for producing 1-(2-aminoethyl)piperazine is provided by catalytic hydrogenation of nitrilotriacetonitrile.

---

This invention relates to a novel method for continuously making 1-(2-aminoethyl)piperazine, herein referred to as AEP. In particular, this invention relates to a process for preparing AEP by the catalytic hydrogenation of nitrilotriacetonitrile.

Many methods have been advanced for the preparation of aminoethylpiperazine. However, processes that are economically feasible and provide aminoethylpiperazine as a primary product of the reaction process are relatively non-existent. Aminoethylpiperazine is a valuable material and is useful as a curing agent for epoxy resins and as a chemical intermediate. An economically sound process that utilizes inexpensive and readily available starting material to enable efficient production of aminoethylpiperazine as a primary product is therefore highly desirable.

It is an object of this invention to provide such a process.

Accordingly, I have discovered that 1-(2-aminoethyl)-piperazine can be prepared in surprisingly high yields and as a principal product of the reaction when nitrilotriacetonitrile is employed as a starting material. According to my discovery, a continuous process is provided for producing aminoethylpiperazine by the catalytic hydrogenation of nitrilotriacetonitrile.

The catalytic process of this invention can be depicted as follows:

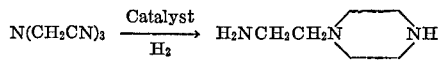

Thus, nitrilotriacetonitrile is continuously contacted with a hydrogenation catalyst in the presence of hydrogen in a suitable reactor such as a tube reactor, at a temperature within the range of about 75–200° C., preferably about 100–150° C. at a pressure within the range of about 500–10,000 p.s.i.g., preferably 1,000–3,000 p.s.i.g. to provide a reaction product containing AEP as a major, e.g. at least 50 wt. percent component of the reaction. The AEP is recovered from the product of the reaction by a suitable means, such as by distillation. The continuous process is operated at pressures sufficient to maintain the reactants and products essentially in the liquid phase. It is preferable that the reaction be conducted in the essential absence of water. It is also preferred that the reaction be conducted in the presence of ammonia which favors the production of the desired aminoethylpiperazine. Correspondingly, the aforementioned pressures can be hydrogen pressures, or mixtures of hydrogen with inert gases, such as nitrogen, can also be employed. Ammonia in the amounts of 0–50 mols per mol of nitrilotriacetonitrile can be employed, preferably about 1–30 and more preferably, about 10–30 mols of ammonia per mol of nitrilotriacetonitrile can be utilized. Space velocities, e.g., grams of total liquid feed per milliliter of catalyst per hour, of about 0.5 to 3, preferably about .75–1.5, are employed. Grams of total liquid feed thus includes the ammonia as well as the nitrilotriacetonitrile if the former is employed, which is the preferred method.

Catalysts which can be suitably employed according to my invention are widely known as hydrogenation catalysts. Hydrogenation catalysts, as herein employed, can be defined as those catalysts that promote the addition of hydrogen to unsaturated carbon to carbon linkages. Exemplary catalysts comprise nickel, copper, iron, palladium, platinum, cobalt, chromium, rhodium, molybdenum, titanium, mixtures thereof, and the like.

The hydrogenation catalysts can be employed in any form desired such as in the finely divided state, pelletized, and the like, in the form of oxides, salts, and the like, in combination with one or more promoters, such as with a material like bauxite, pumice, alumina, kieselguhr, and the like, as well as mixtures thereof.

A particularly effective group of catalysts are those derived from the oxides of chromium, copper, nickel, or cobalt, and mixtures thereof, having a composition calculated in mol percent based on an oxide-free basis comprising about 60–85% nickel or cobalt, from about 5–40% copper, and about 1–15% chromium, with the preferred composition comprising 60–80% cobalt, 5–15% copper and 1–5% chromium.

The starting material, e.g., nitrilotriacetonitrile, is readily available and can be prepared by conventional techniques using readily available starting materials, e.g., hydrogen cyanide, formaldehyde and ammonia.

Illustrative of my ability to produce aminoethylpiperazine in high yields as a principal product of the reaction when nitrilotriacetonitrile is employed as a starting material, the following examples are presented. The examples are illustrative of the foregoing discussion and description but are not to be interpreted as a limitation of the scope thereof or on the materials herein employed.

EXAMPLE I

Hydrogenation of nitrilotriacetonitrile was carried out in a continuous reactor which was fabricated from a stainless steel tube of 1.25 inch inside diameter and 27 inches in length which held 487 ml. of a pelleted cobalt-copper-chromium catalyst preferably as hereinbefore described.

Hydrogen (350 liters/hr., measured at 0° C. and 1 atm.), ammonia (0.52 lb./hr.), and a 25% solution of nitrilotriacetonitrile in dimethylacetamide (0.54 lb./hr.) were metered into the reactor which was operated at 115–125° C. and 2,500–3,000 p.s.i.g. pressure and a total space velocity of 1.0 gram total liquid feed/milliliter catalyst/hr.

The reactor effluent was analyzed by gas-liquid chromatography and is reported below:

Results:*                                    Area percent
    Unknown _____ 2.3
    AEP _____ 68.2
    Nitrilotrisethylamine _____ 29.5

*On a solvent-free basis.

EXAMPLE II

Hydrogen (350 liters/hr. measured at 0° C. at 1 atm.), ammonia 0.59 lb./hr.), and 25% solution of nitrilotriacetonitrile in dimethylacetamide (0.47 lb./hr. were metered into the reactor which was operated at 115–125° C. and 3,000 p.s.i.g. pressure. During the run, 266 g. of nitrilotriacetonitrile was passed over the catalyst.

The reactor effluent was distilled through a 50 x 2.5 cm. glass distillation column containing Goodloe packing. There was obtained 120 g. of aminoethylpiperazine and 40 g. of nitrilotrisethylamine.

The preceding examples can be repeated with similar success by substituting the generically and specifically described components and conditions of this invention for those employed in the examples. As will be evident to those skilled in the art, various modifications of this invention can be made or followed in light of the discussion and disclosure herein set forth without departing from the spirit or the scope thereof.

I claim:

1. A continuous process for producing 1-(2-aminoethyl)piperazine comprising contacting nitrilotriacetonitrile with hydrogenation catalyst comprising nickel, copper, iron, palladium, platinum, cobalt, chromium, rhodium, molybdenum, titanium, or mixtures thereof, in the presence of hydrogen at a temperature within the range of about 75° C. to 200° C. at a pressure within the range of about 500 to 10,000 p.s.i.g. and in the presence of 0 to 50 mols of ammonia per mol of nitrilotriacetonitrile to form a reaction mixture containing aminoethylpiperazine as the principal product of the reaction wherein said contacting is conducted employing space velocities in the range of about .5 to 3; and recovering said aminoethylpiperazine.

2. The process according to claim 1 wherein said temperature is within the range of about 100° C. to 150° C. and said pressure is within the range of about 1,000 to 3,000 p.s.i.g.

3. The process according to claim 2 wherein ammonia is employed in an amount to provide within the range of about 1 to 30 mols of ammonia per mol of nitrilotriacetonitrile.

4. The process according to claim 3 wherein said space velocity is within the range of about .75 to 1.5.

5. The process according to claim 4 wherein said hydrogenation catalyst is derived from the oxides of chromium, copper, nickel, or cobalt, or mixture thereof.

6. The process according to claim 5 wherein said hydrogenation catalyst comprises, based on an oxide-free basis, about 60 to 80 mol percent cobalt, 5 to 15 mol percent copper and 1 to 5 mol percent chromium.

References Cited

UNITED STATES PATENTS

| | | | |
|---|---|---|---|
| 2,605,263 | 7/1952 | Culver et al. | 260—268 SY |
| 2,809,196 | 10/1957 | Miller | 260—268 SY |
| 2,910,477 | 10/1959 | Long | 260—268 SY |
| 3,055,901 | 9/1962 | Speranza et al. | 260—268 SY |
| 3,297,700 | 1/1962 | Mohlbauer et al. | 260—268 SL |
| 3,558,630 | 1/1971 | Moyer | 260—268 DK |
| 3,038,904 | 6/1962 | Godfrey | 260—268 SY |
| 3,565,957 | 2/1971 | Mirviss | 260—583 |

OTHER REFERENCES

Mosher et al., Jour. Am. Chem. Soc., vol. 75, pp. 4949–51 (1951).

DONALD G. DAUS, Primary Examiner

U.S. Cl. X.R.

260—465.8